(12) United States Patent
Isztli et al.

(10) Patent No.: US 11,752,502 B2
(45) Date of Patent: Sep. 12, 2023

(54) REAGENT PACK WITH INTEGRATED WASTE RESERVOIR

(71) Applicant: Diatron MI Zrt., Budapest (HU)

(72) Inventors: Dániel Gergely Isztli, Budapest (HU); Barna Reskó, Budapest (HU); Bence Salló, Tatabánya (HU)

(73) Assignee: DIATRON MI ZRT., Budapest (HU)

( * ) Notice: Subject to any disclaimer, the term of this patent is extended or adjusted under 35 U.S.C. 154(b) by 7 days.

(21) Appl. No.: 16/309,665

(22) PCT Filed: Jun. 14, 2017

(86) PCT No.: PCT/HU2017/050022
§ 371 (c)(1),
(2) Date: Dec. 13, 2018

(87) PCT Pub. No.: WO2017/216591
PCT Pub. Date: Dec. 21, 2017

(65) Prior Publication Data
US 2019/0232291 A1  Aug. 1, 2019

(30) Foreign Application Priority Data

Jun. 14, 2016 (EP) ..................... 16174483

(51) Int. Cl.
*B01L 3/00* (2006.01)
*G01N 35/10* (2006.01)
(Continued)

(52) U.S. Cl.
CPC ............... *B01L 3/527* (2013.01); *B01L 3/523* (2013.01); *B05B 9/047* (2013.01);
(Continued)

(58) Field of Classification Search
CPC ............... G01N 35/1002; B05B 9/047; B05B 12/1418; B01L 3/527; B01L 3/523;
(Continued)

(56) References Cited

U.S. PATENT DOCUMENTS 5,199,594 A    4/1993  Obara
5,665,315 A    9/1997  Robert
(Continued)

FOREIGN PATENT DOCUMENTS

CN     1480378 A  *  3/2004
DE     4027539 A1 *  3/1992  ........... B05B 11/047
(Continued)

OTHER PUBLICATIONS

Jenkins, Kadian."Difference between 'curing' and 'vulcanisation'?—Silicone." Silicone, 2015, https://silicone.co.uk/news/the-difference-between-curing-and-vulcanisation/ (Year: 2015).*
(Continued)

*Primary Examiner* — Matthew D Krcha
*Assistant Examiner* — Tingchen Shi
(74) *Attorney, Agent, or Firm* — Fitch, Even, Tabin & Flannery LLP

(57) ABSTRACT

A reagent pack includes a first reservoir having a continuous rigid wall defining a constant inner space that opens to the ambient environment. An air-tight second reservoir has a flexible wall that defines a variable inner space with one or more second openings. The second reservoir is arranged within the first reservoir and stores fluid reagent. A closure element completely fills the first opening of the first reservoir and includes a first fluid passage fluidly connecting the inner space of the first reservoir, as the waste reservoir, to receive waste liquid. Second fluid passages fluidly connect the second openings of said second reservoirs with respective reagent inlets to supply fluid reagent to the sample
(Continued)

analyzer. The inner space of the first reservoir further includes an air passage to allow gaseous communication with the ambient environment to maintain a controlled pressure within said inner space while receiving waste liquid.

7 Claims, 4 Drawing Sheets

(51) Int. Cl.
*B05B 9/047* (2006.01)
*B05B 12/14* (2006.01)

(52) U.S. Cl.
CPC .. *G01N 35/1002* (2013.01); *B01L 2200/0684* (2013.01); *B01L 2200/16* (2013.01); *B01L 2300/048* (2013.01); *B01L 2300/049* (2013.01); *B01L 2300/123* (2013.01); *B01L 2400/0481* (2013.01); *B05B 12/1418* (2013.01)

(58) Field of Classification Search
CPC ....... B01L 2400/0481; B01L 2300/123; B01L 2300/049; B01L 2300/048; B01L 2200/16; B01L 2200/0684
See application file for complete search history.

(56) References Cited

U.S. PATENT DOCUMENTS

| | | | | |
|---|---|---|---|---|
| 5,799,830 | A * | 9/1998 | Carroll | B67D 7/0288 |
| | | | | 222/105 |
| 6,468,732 | B1 * | 10/2002 | Malin | A01N 1/02 |
| | | | | 204/401 |
| 7,931,859 | B2 | 4/2011 | Mlodzinski | G07F 11/1657 |
| | | | | 422/24 |
| 8,387,817 | B1 | 3/2013 | Zelechonok | |
| 8,505,396 | B2 * | 8/2013 | Zumbrum | A61M 39/18 |
| | | | | 73/863.86 |
| 8,679,425 | B2 | 3/2014 | Ueda | |
| 9,556,012 | B2 * | 1/2017 | Leys | B67D 1/0462 |
| 2005/0170356 | A1 * | 8/2005 | Kureshy | G01N 21/253 |
| | | | | 435/6.11 |
| 2006/0076362 | A1 * | 4/2006 | Masuda | B65D 83/0055 |
| | | | | 222/107 |
| 2014/0261868 | A1 * | 9/2014 | Wrench | G01N 30/22 |
| | | | | 141/4 |

FOREIGN PATENT DOCUMENTS

| | | | | |
|---|---|---|---|---|
| EP | 0473994 | | 3/1992 | |
| EP | 1647499 | | 4/2006 | |
| EP | 3257783 | | 12/2017 | |
| FR | 2821766 | A1 * | 9/2002 | ........... B05B 11/047 |
| JP | 2015006891 | A * | 1/2015 | |
| WO | 8503056 | | 7/1985 | |
| WO | WO-8503056 | A1 * | 7/1985 | ......... B65D 83/0055 |
| WO | WO86008704 | A1 * | 1/1986 | ................ B01L 3/00 |
| WO | 2014153081 | | 9/2014 | |

OTHER PUBLICATIONS

Coran, A.Y. "Chapter 7—Vulcanization." The Science and Technology of Rubber, by Burak Erman et al., Fourth Edition ed., Academic Press, 2013, pp. 338. (Year: 2013).*
Erman, B., Mark, J. E., Roland, M. C. (2013). Chapter 7—Vulcanization. In The Science and Technology of Rubber (Fourth ed., p. 338). Waltham MA: Academic Press. (Year: 2013).*
What's the difference between curing rubber vulcanization? (Jun. 2, 2015). Retrieved May 13, 2021, from https://silicone.co.uk/news/the-difference-between-curing-and-vulcanisation/ (Year: 2015).*
PCT/HU2017/050022 Written Opinion of the International Searching Authority dated Sep. 18, 2017; 5 pages.
PCT/HU2017/050022 International Search Report dated Sep. 18, 2017; 2 pages.
PCT/HU2017/050022 International Report on Patentability dated Jul. 3, 2018; 12 pages.

* cited by examiner

REAGENT PACK WITH INTEGRATED WASTE RESERVOIR

CROSS REFERENCE TO RELATED APPLICATIONS

This patent application is the national phase of PCT/HU2017/050022 filed Jun. 14, 2017, which claims the benefit of European Patent Application No. 16174483.4 filed Jun. 14, 2016.

TECHNICAL FIELD

The present invention relates to improvements in replaceable fluid-storing means to be used in combination with liquid management systems of e.g. in vitro diagnostic medical analyzers. In particular, the invention relates to a reagent pack that contains, besides one or more reservoirs for storing separately one or more different reagents to be used by a diagnostic medical analyzer when said analyzer is in operation, a waste reservoir as well for collecting and storing waste liquids discharged by the diagnostic medical analyzer. The present invention is particularly useful in the fields of hematology and flow cytometry where it is necessary to prepare a blood sample from human or animal whole blood by mixing one or more reagents thereto for further assaying said whole blood mostly by means of hematology analyzers in an automated manner. The invention, however, can also be used when assaying other body fluids that are also mixed with suitable reagents before being assayed.

BACKGROUND

Hematology analyzers are used to measure the quantity and other properties of blood cells in whole blood taken from a human or an animal being. For the measurement, the analyzer takes an aliquot amount of blood (typically about 10 to 100 µl) from a sampling tube, and uses various liquid reagents (typically isotonic diluents, differential and selective lyser, stopper, RNA paints, detergents, cleaner, etc., at least some of them containing foam forming agents, too) stored in separate reservoirs to mix with the amount of blood taken out. The thus obtained mixture is then subjected to an assay which can be either an impedance or an optical based measurement. Upon completing the assay, the mixture of liquid reagents and blood is discharged from the analyzer as waste. Taking the blood and the reagents, mixing them together, directing the mixture through an assaying station formed within the analyzer and finally discharging the used mixture as waste is performed by the liquid management system of the analyzer which, in general, comprises a fluidic system open to the environment. Due to its open construction, the fluidic system also contains air sucked in by e.g. a suction pump that performs the discharge of the mixture as waste. Thus, as a consequence of the mixing effect exerted by the sucking pump, said waste actually comprises small bubbles of air and gets foamed as well. In operation, the analyzer performing the assay, therefore, consumes liquid substances (reagents, blood) and produces/discharges a liquid substance containing a significant amount of air with some foam, as waste. Moreover, as a component of said air-containing, foamy liquid substance comes from the whole blood assayed, said waste is basically a biohazardous waste and, as such, shall be handled with care and in accordance with safety standards and regulations. In particular, said foamy, air-containing biohazardous waste has to be collected to the full extent when it leaves the fluidic system of the analyzer.

Nowadays, a standard approach for collecting the waste is to discharge said waste into a dedicated waste collection reservoir that locates outside or inside the analyzer.

It is also a common practice to provide various liquid reagents to be used in a certain kind of assaying together, that is, to prepare a multi-reagent pack with all the required reagents arranged in separate closed containers of the multi-reagent pack.

For a continuous use, reagents must be replaced when respective reagent containers get emptied, and the waste has to be disinfected and then safely disposed of when the waste collection reservoir fills. The replacement process of the containers should be safe, biohazard-free and fool-proof.

For easy handling, the reagent containers and the waste collection reservoir can be integrated into a common container. The volume of the common container can be constant and minimized by exploiting the fact that due to the consumption-production-like behavior of the analyzer, the total volume of the reagents and that of the liquid portion of the waste is fairly constant. This concept is already known e.g. from International Publication Pamphlet no. WO85/03056 A1 which discloses a multi-function container, in particular, a camping water reservoir for fluids comprising a rigid outer casing and an internal flexible membrane dividing the interior into two compartments and permitting each compartment to expand and contract as the other compartment respectively contracts and expands, wherein each compartment has an inlet and/or an outlet.

U.S. Pat. No. 5,199,594 teaches a container for recovering a used treating liquid. The container is composed of an outer box and a flexible inner bag. The inner bag is held within the outer box and has a partition wall by means of which the interior thereof is divided into a treating-liquid storage chamber and a used-liquid storage chamber. Said storage chambers each has an access port by way of which each storage chamber is connected to an outer associated apparatus. To avoid pin-holes and oozing, the inner bag is made of a sheet material with 4 to 6 layers by welding said layers appropriately together. The outer box is made of corrugated cardboard. Construction of the inner box is rather complex and thus requires a relatively complicated production technology.

U.S. Pat. No. 5,665,315 discloses a replaceable bag-in-box type liquid substance container to be used in a hematology analyzer. The container has an outer box that contains a plurality of flexible, retractable bags filled with reagent and a flexible bag for collecting the waste discharged by the analyzer. In use, the bags containing reagent have their spouts directed downwards, while the bag for collecting the waste has its spout directed upwards, that is opposite to the direction of the bags with reagents. This construction is rather cumbersome due to the separate spouts and their application. Moreover, as each bag should be placed separately within the outer box, the assembling procedure of the liquid substance container is complicated. A similar bag-in-box type liquid substance container is taught in U.S. Pat. No. 8,679,425 B2. Here, some of the separate flexible retractable bags are actually substituted with reservoirs that have rigid walls.

U.S. Pat. No. 8,387,817 B1 discloses a container for holding fluids in isolation, the container includes an outer container, as well as first and second deformable inner containers carried within the internal space of the outer container. The inner containers have respective ports communicating with their interiors. As fluid is withdrawn from the first inner container its volume is reduced so that the second container may receive a like amount of fluid. The container may be used with various chemical applications, such as high performance liquid chromatography or fluid injection analysis, wherein supply fluid is withdrawn from the first inner container through its port, used, and returned as waste fluid to the second inner container through its port so that the overall volume of fluids remains relatively constant within the container. As said inner containers are deformable, both may change its shape within the outer container upon withdrawal of the supply fluid and return of the waste fluid. To avoid any undesired changes of shape in operation, e.g. a deformation of the first container that results in complete plugging of fluid passage when fluid is withdrawn, especially at lower supply fluid levels in said first inner container, each of the first and second containers is equipped with a straw-like, elongate, hollow tube having openings or perforations in its wall that starts at said port, extends downwardly and terminates internally near the bottom of the respective container; by means of said openings or perforations an even suction/discharge of supply/waste liquid from/into the first/second inner container is ensured along the longitudinal extension of the inner containers which allows to avoid undesired changes in shape. The application of said straw-like hollow tubes makes, however, the preparation of the reagent pack more complicated, introduces at least an extra technological step to be performed, and hence raises the risk of becoming contaminated during assembly and also increases the costs.

International Publication Pamphlet No. WO2014/153081 A1 teaches a container for use with a high-pressure liquid chromatography instrument (HPLC). The container has an external exterior container shell, an internal fluid container for holding fluid medium, an interstitial volume between the external exterior container shell and the internal fluid container, a port for fluidly connecting the interstitial volume with a pressurized gas source, and a port for fluidly connecting the internal fluid container to the HPLC instrument. In use, as the amount of pressurized gas within the interstitial volume increases, fluid medium is compelled to flow out of the port connected to the internal fluid bag.

Furthermore, US Published Patent Appl. No. 2005/0170356 A1 discloses a multi-reagent pack that has a plurality of reagent compartments and further includes a read-write memory chip to carry data pertaining to the multi-reagent pack, the reagents provided within the compartments, a test protocol in which the reagents are to be used, a locking code, as well as a chronologic information. In use, said data may be transferred between the reagent pack and an analytic device into which the multi-reagent pack is installed for performing tests in which the reagents are used. Data stored in said memory chip can optionally be shared with the supplier of the pack as well. To this end, almost any kind of known data transfer protocol, i.e. wired or wireless, can be equally applied.

Moreover, European Publication Pamphlet No. 473,994 A2 discloses a squeeze pack with an integrated internal container for storing and delivering a liquid filling material. Said squeeze pack comprises a substantially dimensionally stable but elastically deformable external container and the easily deformable internal container arranged inside it. The dimensional stability of the external container is selected in such a way that, after it has been compressed, in particular by a manual squeezing force, it can return to its original configuration, while the deformable internal container, under the effect of increased pressure, can almost entirely collapse and can thus be emptied. A closure means closes off both the intermediate space between the internal and external containers and also the interior of the internal container relative to the external atmosphere and further closes off the interior of the internal container relative to the intermediate space. The closure means has a delivery valve for discharge of the filling material from the internal container and a venting valve for the intermediate space. The internal container is carried by a sleeve-like holding means which is arranged between the external container and the closure means and which provides passages communicating the intermediate space with the venting valve. Said delivery valve ensures that the filling material issues from the internal container when the increased pressure appears, as a result of e.g. manually squeezing the external container. Said venting valve ensures that air can pass from the outside into the intermediate space between the internal and external containers when the increased pressure ceases, as a result of e.g. releasing the pressing force or discharging a dose of filling material from the internal container. Hence, the intermediate space merely functions as a periodic pressure source to facilitate the discharge of the filling material through the delivery valve.

As it was previously discussed, in most cases a foamy, air-containing, chemically and/or biologically hazardous waste leaves the fluidic system of the analyzer. According to our studies, the discharged waste contains at least 50% air, that is, at least half of the waste of unit volume is air which is also fed back with the liquid phase portion from the analyzer into the bag-in-box type reagent packs used nowadays. However, problems due to air within such reagent packs are quite frequent due to the constructional design. Since fluidic systems installed into existing analyzers are not able to eliminate the air from the waste, accumulation of air within reagent packs constructed with an integral waste reservoir poses a significant problem. In particular, as a consequence of continuous air accumulation, a undesired pressure prevails within the waste reservoir that might result in oozing/leakage of the connectors of the reagent-containing reservoir(s) within the pack, as the waste collection reservoir exerts basically and continuously a pressure to the reagent-containing one(s).

Moreover, according to our studies, a flexible reagent reservoir either has a fluid outlet on the bottom or is equipped with a tube that goes down to its bottom via the fluid outlet arranged at its sides or top. Provision of a fluid outlet on the top of a flexible reservoir with no internal tube will result in collapsing the top of the reservoir when liquid is being drawn out from its inner space. Thus, the outlet gets sealed and the liquid flow gets blocked much before the reservoir is fully depleted. A tube to be integrated into the flexible reservoir to avoid this problem represents, however, an extra component, requires a further assembling step and is a potential source of contamination inside the reservoir. Having the fluid outlet on the bottom of the reagent reservoir has the risk of leakage.

SUMMARY

In view of the foregoing discussion, an object of the invention is to provide an improved reagent pack with integrated waste reservoir, especially for sample analyzers, wherein the problem of air accumulation is under control and, particularly, is mostly eliminated.

Another object of the invention is to eliminate or at least alleviate disadvantages of existing reagent packs with integrated waste reservoir to be used in sample analyzers. In particular, an object of the present invention is to improve constructional design and thereby to ease the problem of accidental plugging and early fluid flow blockage, as well as to allow reagent withdrawal from flexible reagent-containing reservoir(s) to higher extent, i.e. almost completely.

Moreover, any chemical or biological contamination, dust or particles in the reagents would cause the analyzer to provide inaccurate measurement results. The reservoirs and further accessories used in connection with said reservoirs (e.g. connectors, etc.) thus need to be clean and sterile that requires special manufacturing technologies. Cleaning and sterilization of various parts of the reagent pack, as well as their subsequent assembling into the reagent pack along with maintaining the obtained cleanness and sterility is much easier if only few parts have to be handled. In particular, the smaller the number of various parts is, the easier/simpler is to prepare a reagent pack ready to be filled with liquid reagents.

The above objects are achieved by means of a novel construction of the reagent pack with integrated waste reservoir, wherein the reagent pack is provided with an air passage formed in the wall of the waste reservoir, wherein said air passage is in direct gaseous communication with the ambient environment of the reagent pack and thus provides a continuous pressure control within the waste reservoir. In this way, any gas entering the waste reservoir in the waste liquid can simply leave the waste reservoir and no undesired gas (especially, air) accumulation will take place in the reagent pack.

Furthermore, the above objects are achieved by exploiting the advantage of storing the biohazardous waste liquid integrally within a reagent pack that also forms the source of the liquid reagents. For such a bag-in-box type reagent pack, the simultaneous consumption of reagents and accumulation of waste by a sample analyzer connected with said reagent pack guarantees a constant space occupation level within a rigid-walled waste reservoir (box). Thus, at every point over the flexible wall of the reagent-containing reservoirs (bag) arranged within the waste reservoir, the internal and external pressures, that is, the pressures prevailing on the two opposite sides of the flexible wall, will be roughly equal, which causes the reagents not to tend to flow to the bottom of the reagent reservoir, i.e. the reagent reservoir behaves as if it was in a zero gravity environment. This makes it possible to draw out the reagents through the fluid outlets in any configuration with no need for further means, e.g. hollow tubes.

In particular, the present invention relates to a reagent pack with integrated waste reservoir to be used in a sample analyzer, wherein the sample analyzer comprises a liquid management system with at least one reagent inlet and a waste outlet and integrated into a sample analyzer as described herein.

The present invention also relates to a method to manufacture a reagent pack with integrated waste reservoir to be used in a sample analyzer, as define in claim 17. Preferred further variants of the method are defined in claims 18-21.

BRIEF DESCRIPTION OF THE DRAWINGS

The invention and its further advantages will be apparent and can be better understood at once from the detailed description of a preferred embodiment to be used in combination with a hematology analyzer with reference to the attached drawings, wherein.

DETAILED DESCRIPTION

Figure 1:
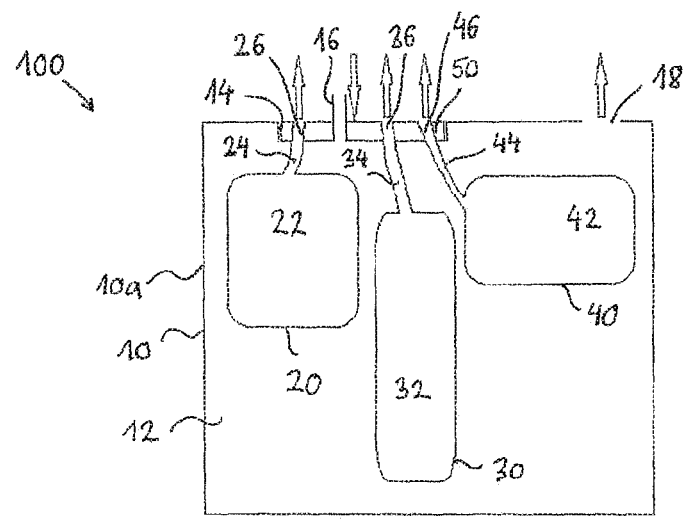
FIG. 1 is a schematic sectional view of a cartridge-like reagent pack according to the invention with three fully detached second (reagent-containing) reservoirs.
Figure 2:
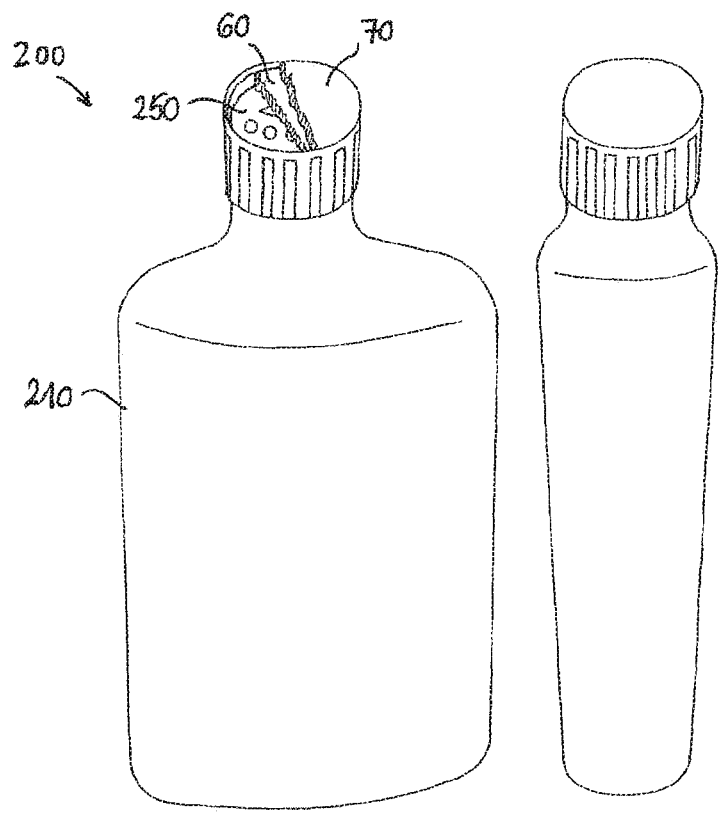
FIG. 2 shows schematically a further exemplary embodiment of the reagent pack, wherein the waste reservoir is provided in the form of a bottle.

Referring now to FIG. 1, the reagent pack 100 of the invention is depicted as embodied in the form of a cartridge. The reagent pack 100 is constructed to be used in combination with an external sample analyzer (not illustrated) that is provided with an integrated liquid management system for handling a liquid phase sample when subjected to at least one measurement performed in at least one assaying station of the analyzer. Said handling includes, amongst others, e.g. taking a sample to be assayed from e.g. a separate sample holder and one or more reagents assisting in said assaying from the reagent pack 100 itself, mixing the sample and the reagents together, directing the mixture through the assaying station provided within the analyzer and finally discharging the used mixture as waste into the reagent pack 100 according to the invention. To this end, in particular, the reagent pack 100 is equipped with an inlet that is connectable with a waste liquid output of said liquid management system. Moreover, the reagent pack 100 is also equipped with one or more outlets that are connectable with reagent inputs of said liquid management system. A suitable sample analyzer for using with the reagent pack 100 is a hematology analyzer for assaying human or animal whole blood that also has preferably an automated operational mode. However, the reagent pack 100 can also be used with other type of sample analyzers as well, as it is clear for a person skilled in the art.

Said reagent pack 100 comprises an outer (first) reservoir 10 with a continuous wall 10a defining an inner space 12 that is preferably constant (in both shape and size/volume). Said reservoir 10 serves as waste reservoir, it is configured to receive, in use, the spent mixture discharged from the liquid management system. The inner space 12 can be of any size, it is preferably about 0.1 to 5 liters, however, the reagent pack 100 according to the invention can equally be prepared with smaller and larger volumes as well. Here, the outer reservoir 10 has a rectangular box shape, its continuous wall 10 is formed by the sidewalls of the box joining together at edges and corners of the box. Sidewalls of the box are made of preferably a rigid and liquid-proof substance, e.g. a metal, a plastic material, such as high-density polyethylene (HDPE) or any other suitable material. Liquid-proof behaviour of the reservoir 10 can also be achieved by coating its inner side, i.e. the side facing to the inner space 12, with a liquid-impermeable layer/lining. Furthermore, said substance is also resistant to chemically and/or biologically hazardous liquids that might fill the volume 12 of the reservoir 10. The reagent pack 100 can be of any shape. Besides the rectangular box shape, however, cylindrical, spherical, conical frustum and truncated pyramid shapes can be considered to be the most preferred shapes of the reagent pack 100 when the efficiency of space occupation is taken also into account.

Said reagent pack 100 further comprises one or more inner (second) reservoirs; here, as shown in FIG. 1, separate reservoirs 20, 30, 40 serving as reagent-containing reservoirs. The one or more second reservoirs 20, 30, 40 are disposed within the inner space 12 of the waste reservoir 10, are made of a flexible material, such as a polymeric material, e.g. a polypropylene-based polymeric material, are sealed and are impermeable to both the liquid reagents that they are to hold and the waste liquid that surrounds them. In use, said second reservoirs 20, 30, 40 are actually floating in the waste liquid discharged from the sample analyzer into the inner space 12. Furthermore, each of the second reservoirs 20, 30, 40 is collapsible and its continuous wall defines a variable inner space 22, 32, 42, respectively, that varies in both shape and size/volume upon a liquid substance is drawn from it and/or an external force exerted thereon by the waste liquid that surrounds it. Each of said reservoirs 20, 30, 40 is provided with a (second) opening 24, 34, 44, respectively, in the form of a spout or tube inserted into and sealed to the respective reservoir 20, 30, 40. The one or more second reservoirs 20, 30, 40 are configured to supply—in use—one or more, in general, different reagents arranged within the reservoirs 20, 30, 40 to the liquid management system through the openings 24, 34, 44, as desired/predetermined. A net volume of the second reservoirs 20, 30, 40 can vary from about zero, i.e. when all the second reservoirs 20, 30, 40 are essentially empty, to about the total volume of the inner space 12 of the waste reservoir 10, i.e. when all the second reservoirs 20, 30, 40 are essentially full of reagents and occupy substantially the entire volume of the waste reservoir 10. Thus, the waste reservoir 10 and the one or more second reservoirs 20, 30, 40 are configured so that the internal volume of the waste reservoir 10 will be substantially equal to the overall fluid reagent volume that can be filled into the second reservoirs 20, 30, 40. As the amount of samples to be assayed is an aliquot amount, this implies that the reagent pack 100 can be used by the time of full depletion of the reagents since the waste reservoir 10 can collect the whole amount of waste produced by consuming the overall reagent amount.

The second reservoirs 20, 30, 40 are configured to be filled with various liquid reagents used in the field of sample analysis which are typically liquid iso-tonic diluents, differential and selective lyser, stopper, RNA paints, detergents, cleaner, etc.

Said reagent pack 100 further comprises a first opening 14 formed in the wall 10a that allows a direct connection between the inner space 12 and its ambient environment (i.e. the space external to the reagent pack 100) surrounding the waste reservoir 10. The opening 14 can be of any size and shape that is suitable for inserting the one or more second reservoirs 20, 30, 40 through it into the inner space 12 of the outer reservoir 10 one after the other (as might be the case here) or together (simultaneously) in a single run if the reservoirs 20, 30, 40 are laid on one another and then folded and/or twisted together (see e.g. FIGS. 3 and 6).

Said reagent pack 100 also comprises a closure element 50 formed basically from an elastic material, such as silicone, e.g. vulcanized silicone, rubber or any other suitable materials, as a single piece element with a shape complementary to that of the opening 14 of the waste reservoir 10.

The closure element 50 has two tasks. On the one hand, it forms a connector between the liquid management system of the sample analyzer and the inner spaces 12, 22, 32, 42 of the waste reservoir 10 and of the second reservoirs 20, 30, 40, respectively. In particular, the closure element 50 is provided in its bulk with fluid passages 16, 26, 36, 46, each of which, at one end thereof, is fluidly connected with a respective one of said inner spaces 12, 22, 32, 42, respectively. The other ends of said passages 16, 26, 36, 46 are configured to be fluidly connected with a waste outlet and respective reagent inlets of the liquid management system (not shown). Said fluid passages 16, 26, 36, 46 are made preferably in the form of separate through holes. The connections between the closure element 50 and the openings 24, 34, 44 of the second reservoirs 20, 30, 40 are firm connections. This means that the closure element 50 and all the second reservoirs 20, 30, 40 are handled together when e.g. assembly of the reagent pack 100 takes place. On the other hand, said closure element 50 provides a sealed closure of the waste reservoir 10 when is fitted into its opening 14. That is, when said reagent pack 100 is assembled, the opening 14 is closed by the closure element 50 inserted into said opening 14 in a liquid-tight manner, i.e. a leakproof/press fit is formed between the closure element 50 and said opening 14. To improve this connection in order to avoid any loosening of the closure element 50 in its place, an additional fixation thereof can also be applied by e.g. bonding it into said opening 14.

Said reagent pack 100 further comprises a second opening formed in said wall 10a as an air passage 18, i.e. it also permits a direct connection between the inner space 12 and the ambient environment surrounding the waste reservoir 10. That is, said inner space 12 is in gaseous communication with the ambient environment. The air passage 18 can be of any size and shape that is suitable for efficiently controlling, especially reducing the pressure that builds/would build up in the inner space 12 when the reagent pack 100 is used in an operating sample analyzer. To avoid spillage of the waste from the waste reservoir 10, the air passage 18 is arranged in that portion of the wall 10 that locates essentially at the highest possible position when the reagent package 100 is in use. In FIG. 1, this portion is represented by the top sidewall of the box shaped waste reservoir 10. In a yet further embodiment of the reagent pack 100, a gas pressure adjusting means can be arranged in said air passage 18 in order to assist in controlling and/or to adjust/set the value of the pressure prevailing in the inner space 12. The pressure adjusting means can be any of, without claiming completeness, per se known check valves, pressure limiting valves, automated air-release valves, manually operated valves, etc., as is clear fora person skilled in the art.

Said air passage 18 can also be provided in the form of more than one through holes in said wall 10a which may be either distributed over the highest possible region of the wall 10a or located in a group close to one another. Due to the formation of said air passage 18, the risk of an undesired pressure build-up or a sudden pressure peak in the inner space 12 significantly decreases. Said air passage 18 can be formed in the closure element 50 itself.

FIGS. 2 to 5 illustrate a further preferred embodiment of the reagent pack according to the present invention, here in the form of a bottle-shaped reagent pack 200. Reagent pack 200 comprises first (outer) reservoir 210 in the form of a bottle, made of e.g. HDPE, that defines a constant inner space 212. In the inner space 212, there is arranged a second (inner) reservoir 220 formed of e.g. a set of the three second reservoirs 20, 30, 40 of reagent pack 100 discussed previously, but here permanently joined together. Thus, from now on, the second reservoir 220 is considered to be a single unit comprised of three reservoirs as separate and sealed compartments formed by a main reservoir and two further reservoirs of smaller volume. As to its further features, properties and construction, the second reservoir 220 is identical with the second reservoirs 20, 30, 40 that are basically not joined with (i.e. detached from) one another. Second reservoir 220 can be filled with various reagents similarly to the second reservoirs 20, 30, 40. Said reagent pack 200 further comprises a first opening 214 which is actually provided by a mouth opening of the bottle-shaped first reservoir 210. Air-tight closure of the first opening 214 and the capability of the reagent pack 200 to be fluidly connected with the liquid management system of a sample analyzer is provided by a closure element 250 that has similar properties to that of closure element 50 discussed previously. In particular, in FIG. 3, fluid passages 226, 236, 246 belonging to the compartments of the second reservoir 220, fluid passage 216 opening into the inner space 212 and air passage 218 formed in said closure element 250 can be clearly seen. These are identical with respective elements of the closure element 50 discussed previously.

Figure 5:
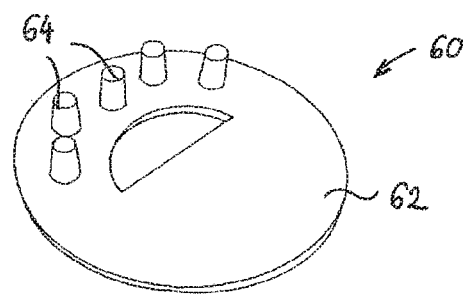
FIG. 5 represents an exemplary sealing unit to be inserted into the fluid passages of the reagent pack for air-tight closure and seal of said passages of the second reservoir.
Figure 4:
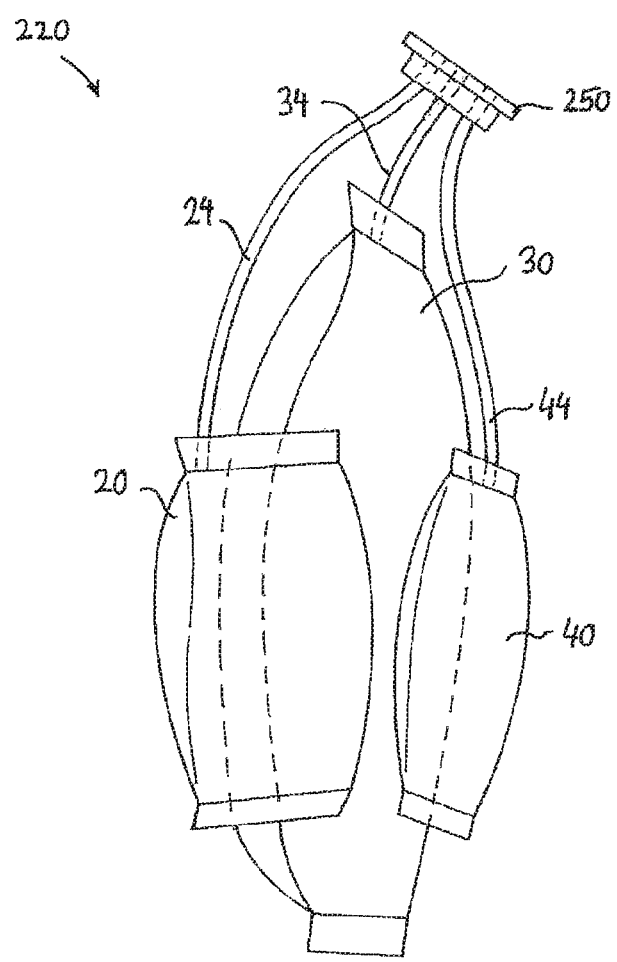
FIG. 4 shows the exemplary reagent pack of FIG. 2 in its assembled state, that is, with the second reservoir of FIG. 3 arranged in the waste reservoir.

In order to avoid mixing of various reagents filled into the separated compartments of the second reservoir 220 when the reagent pack 200 is in storage, an individual sealed closure of each compartment of the second reservoir 220 is provided by a sealing unit 60 shown in FIG. 5. Sealing unit 60 is made preferably of silicone, rubber or any other suitable material as a single piece element. When the reagent pack 200 is in storage, the sealing unit 60 is to be inserted into the fluid passages 216, 226, 236, 246 and the air passage 218 formed in the closure element 250. To this end, the sealing unit 60 has a sheet element 62 and several plug elements 64 projecting out from the sheet element 62 on one side of the sheet element 62. The number of plug elements 62 is equal to at least the number of fluid passages 226, 236, 246 of the second reservoir 220 to be sealed. In such a case, a geometrical disposition of plug elements 64 fully conforms to that of the fluid passages 226, 236, 246. In a preferred embodiment, however, the number of plug elements 62 is equal to the number of fluid passages formed in the closure element 250, and also the geometrical disposition of said plug elements 64 conforms to that of the passages formed in the closure element 250. Each plug element 64 has a shape and dimension that conform to those of a respective passage into which it should be fitted. Hence, to achieve the required sealing effect, plug elements 62 of the sealing unit 60 are aligned with the passages to be sealed and then simply pushed into place by a single movement.

Moreover, when the reagent pack 200 is in storage, it is closed by a per se known threaded cap 70 that can be screwed on mating threads 214a provided on the outer side of the first opening 214, i.e. on at least a portion of a neck of the bottle-shape reagent pack 200. As is clear for a skilled person in the art, before connecting the reagent pack 200 with the liquid management system of a sample analyzer for use, the cap 70 should be screwed off and the sealing unit 60 should be removed.

Figure 3:
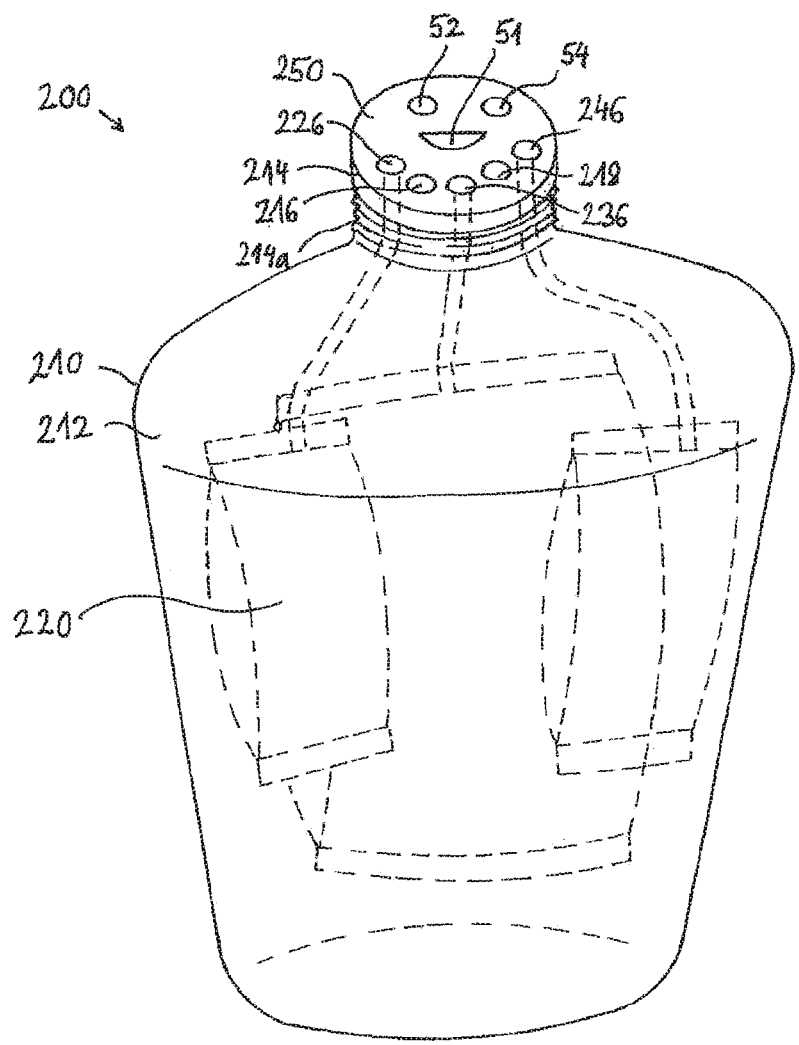
FIG. 3 is a perspective view of an exemplary second reservoir comprised of three reservoirs, joined permanently together, that form a main compartment and two further compartments of smaller volume of the second reservoir.

Reagent pack 200 further comprises appropriate electronic means to provide a lifetime monitoring of the reagent pack. To this end, the closure element 250 is configured to receive a suitable electronic device and provide suitable electric connections for either a user (e.g. reagent pack supplier) or the sample analyzer itself to establish data communication between the electronic device and an external unit. As is shown in FIG. 3, the closure means 250 is provided with a cavity in its bulk, in which a per se know electronic unit 51 is disposed. The electronic unit 51 is provided with a read/write memory unit and a power source providing the energy for its operation and the at least non-stationary/periodical data communication with the external unit. The electronic unit 51 is adapted to allow the storage, read-out and modification of information located in the memory unit. Said information covers, without claiming completeness and mentioning some representative examples, supplier data, such as e.g. a serial number of the reagent pack, its production LOT number, the original content/volume of the reagent pack, date of production, further product identification data, and user side data created at the first time of usage of the reagent pack by the sample analyzer with which the reagent pack has been used or the external unit installed into the analyzer, such as e.g. the date of first opening of the reagent pack, content still available for use, number of completed analysis, etc.. The data communication can be either a wireless communication or a wired one by means of suitable electrodes 52, 54 also arranged in the closure element 250.

The reagent pack 200 is especially preferred when e.g. its transporting and handling is considered. It requires no further external container when transported and its rigid fluid-proof outer reservoir, the waste reservoir, continuously protects the flexible second reservoir(s), the reagent-containing reservoir(s), arranged in the (integral) waste reservoir from mechanical impact without a need for additional protection. The connection between the reagent-containing reservoirs and the sample analyzer locates at the topmost position of the reagent pack, thus preventing any leakage at the connection.

The rigid-walled outer reservoir and the one or more flexible-walled reagent-containing reservoirs, independent of the fact whether they are provided as detached from one another or joined together, are manufactured separately and even remote from one another. This means that before filling with reagents, the reagent pack should be assembled. Before assembling, an appropriate sterilization step must be performed in order to avoid any contamination within the reservoirs. After completion of the sterilization procedure, the reagent-containing reservoirs are inserted into the inner space of the waste reservoir for producing the reagent pack with integrated waste reservoir according to the invention.

Figure 6:
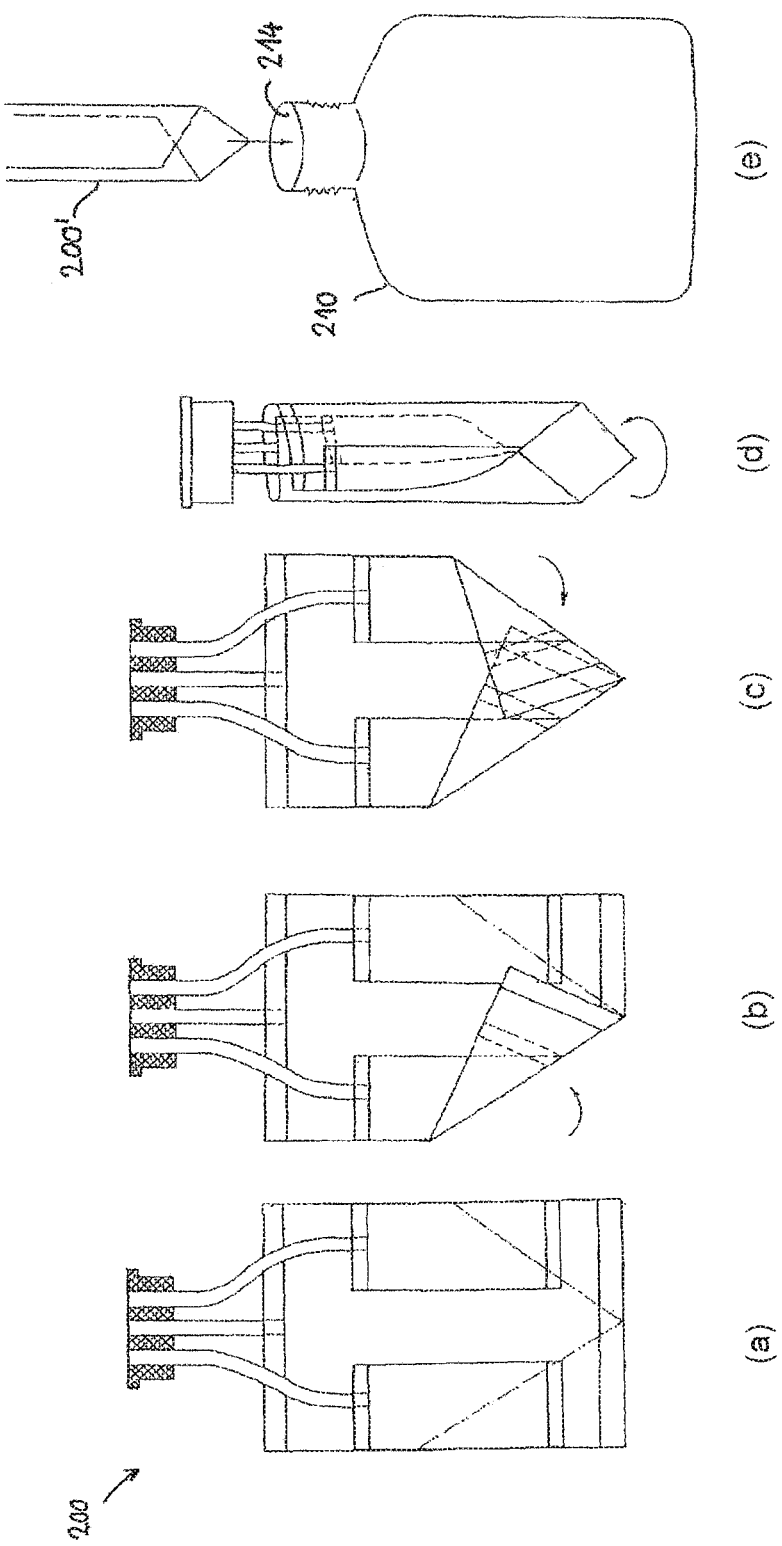
FIGS. 6(a) to 6(e) show various phases of folding together and then arranging the second reservoir illustrated in FIG. 3 in a bottle-like waste reservoir.

FIG. 6, plots (a) to (e) illustrate the steps of a possible assembly procedure for the reagent pack 200, however, similar steps can be performed in case of reagent pack 100 as well, if the box-shaped outer reservoir 10 is provided with a first opening 14 that is relatively small compared to the external dimensions of the second reservoirs 20, 30, 40 to be inserted into the waste reservoir 10.

According to this, second reservoir 200 is folded back to itself parallel to its longitudinal axis in several consecutives steps (a) to (c) by means of consecutive foldings so as to reach a folded second reservoir 200' in step (d) with a lateral dimension (i.e. basically in perpendicular to the longitudinal axis) commensurate to the size of the first opening formed in the first reservoir. Then in step (e) the folded second reservoir is inserted into the first reservoir 210 through the first opening 214 to its full extent. Then the closure element is air-tightly inserted into the first opening 214 and a buffer fluid is poured into the first reservoir through the fluid passage up to the target level with a simultaneous removal of the air from the second reservoir. As a next step, second reservoir is filled up, due to which it opens and will occupy the inner space of the first reservoir. During the filling process, the level of the buffer fluid within the inner space of the first reservoir is kept constant, at its target level. The buffer fluid helps the opening of the second reservoir as it lubricates both the rigid wall of the first reservoir and the flexible wall of the second reservoir. After filling up the second reservoir, the sealing unit is inserted into the passages of the closure element and then the threaded cap is screwed onto the first opening. Now, the reagent pack is ready for being sold or transported.

The invention has been described in detail with regard to a particularly preferred embodiment. It is apparent, however, that many changes and variations thereof may be made without departing from the spirit of the invention, and such changes and variations are also intended to fall within the scope of the attached claims.

The invention claimed is:

1. A method to manufacture a reagent pack (200) with integrated waste reservoir to be used in a sample analyzer, the method comprising:
providing a first reservoir (210) having a continuous rigid wall that defines an inner space (212) and is provided with a first opening (214) of a given size formed in said rigid wall;
providing a second reservoir (220) having a continuous flexible wall that defines a variable inner space (212) and is provided with one or more second openings formed in said flexible wall;
folding back said second reservoir (220) to itself parallel to a longitudinal axis of said second reservoir through several consecutive folds, thereby obtaining a folded second reservoir (200') with a dimension in a direction perpendicular to said longitudinal axis being commensurate to the size of the first opening;
inserting the folded second reservoir into the first reservoir (210) to its full extent through the first opening (214);
inserting a closure element air-tightly into the first opening, the closure element having a body adapted to connect with a portion of the sample analyzer such that, upon connecting the body of the closure element to the portion of the sample analyzer, the inner space of the first reservoir is fluidly connected with an outlet of the sample analyzer via a first fluid passage of the closure element and the second reservoir is fluidly connected to an inlet of the sample analyzer via at least one second fluid passage of the closure element;
filling a given amount of buffer fluid through a first fluid passage of the closure element into the inner space between the rigid wall of said first reservoir (210) and the flexible wall of said second reservoir (220) to lubricate both of said walls to facilitate a first filling of the second reservoir after placement within the first reservoir;
performing the first filling of the second reservoir including filling up the second reservoir with a fluid reagent through the at least one second fluid passage of the closure element while keeping the amount of the buffer fluid constant, thereby continuously opening said second reservoir within the inner space of the first reservoir, wherein lubricating said walls facilitates the opening of the second reservoir in the inner space of the first reservoir;
sealing the closure element after filling up the second reservoir; and
mounting a threaded cap onto the first opening, thereby providing the reagent pack (200) ready for being used in a sample analyzer.

2. The method according to claim 1, wherein providing said second reservoir includes providing said second reservoir having a plurality of compartments defining inner spaces separated from one another, individual ones of the plurality of compartments provided with a single opening, individual ones of said openings corresponding to a respective second opening of the at least one second opening of said second reservoir, wherein the individual ones of the single openings are in fluid communication with a respective fluid passage of the at least one second fluid passage formed in the closure element.

3. The method according to claim 2, wherein folding said second reservoir (220) includes folding the plurality of compartments of the second reservoir together to obtain the folded second reservoir (200') and wherein inserting the folded second reservoir includes inserting the plurality of compartments together into the first reservoir (210).

4. The method according to claim 1, further comprising forming the compartments of the second reservoir as separate reservoirs that are joined together with at least a portion of a wall forming each compartment connected to a portion of a wall forming another compartment.

5. The method according to claim 1, wherein said first and second reservoirs are sterilized before the folding back said second reservoir (220) to itself.

6. The method according to claim 1, wherein the second reservoir comprises fluid reagent(s) to be used in assaying human or animal whole blood.

7. The method according to claim 1, wherein the body of the closure element is adapted such that connection of the body of the closure element to the portion of the sample analyzer simultaneously connects the inner space of the first reservoir with the waste outlet of the sample analyzer and the second reservoir to the inlets of the sample analyzer.

* * * * *